United States Patent [19]

Stenton

[11] Patent Number: 5,517,297
[45] Date of Patent: May 14, 1996

[54] RANGEFINDER WITH TRANSMITTER, RECEIVER, AND VIEWFINDER ON A SINGLE COMMON OPTICAL AXIS

[75] Inventor: Conrad Stenton, Midland, Canada

[73] Assignee: Hughes Aircraft Company, Los Angeles, Calif.

[21] Appl. No.: 322,974

[22] Filed: Oct. 13, 1994

[51] Int. Cl.$^6$ .................................................... G01C 3/00
[52] U.S. Cl. ............................................................. 356/4.01
[58] Field of Search ............................................. 356/4.01

[56] References Cited

U.S. PATENT DOCUMENTS

| | | | |
|---|---|---|---|
| 3,464,770 | 9/1969 | Schmidt | 356/4.01 |
| 3,671,127 | 6/1972 | Odone et al. | 356/4.05 |
| 3,698,812 | 10/1972 | Nelson | 356/5.08 |
| 3,781,552 | 12/1973 | Kadrmas | 356/4.01 |
| 4,165,936 | 8/1979 | Eisenring et al. | 356/4.01 |
| 4,355,893 | 10/1982 | Chiklis | 356/4.01 |
| 4,504,143 | 3/1985 | Heinze et al. | 356/4.01 |
| 5,329,347 | 7/1994 | Wallace et al. | 356/4.01 |

FOREIGN PATENT DOCUMENTS

| | | | |
|---|---|---|---|
| 2536956 | 2/1977 | Germany | G01S 7/48 |
| 2536910 | 2/1977 | Germany | G01S 7/48 |

*Primary Examiner*—Thomas H. Tarcza
*Assistant Examiner*—Pinchus M. Laufer
*Attorney, Agent, or Firm*—M. W. Sales; W. K. Denson-Low

[57] ABSTRACT

A laser rangefinder (50) having visual, transmit and receive optical channels all arranged on a common rangefinder axis (70). A laser emitter (54) located on the axis directs its light away from the rangefinder output toward a reflector surface, also located on the axis. The reflector in turn reflects the laser light back toward the output to an objective lens (52) which collimates the reflected light into a collimated output beam. A portion of the light reflected from the target is passed through the objective lens and imaged onto a reticle (66) on the axis. A dichroic reflector (62) intercepts the imaged light and refracts a portion of the light to a field stop 60 and then to a detector 58, both located on the axis. A range display (64) is located in the plane of the reticle and off the axis for display target range information. An eye piece (68) receives light passing through the reticle.

37 Claims, 1 Drawing Sheet

RANGEFINDER WITH TRANSMITTER, RECEIVER, AND VIEWFINDER ON A SINGLE COMMON OPTICAL AXIS

FIELD OF THE INVENTION

This invention relates to laser rangefinder equipment, and more particularly to a unique arrangement of reflecting and refracting optics used to provide a visual channel, a transmitter channel and a receiver channel all on the same axis.

BACKGROUND OF THE INVENTION

Laser rangefinders include a transmitter channel for transmitting a collimated light beam toward a target, a receiver channel for receiving and processing light reflected from the target, and an optical sighting channel through which the user could sight on the target. Coaxiality of the channels provides a number of benefits, including boresight stability over temperature and vibration, and reduction of weight and size of the rangefinder resulting from sharing of the optical paths. Conventional rangefinders have required complex beamsplitters to have the sighting, transmitting and receiver channels coaxial.

SUMMARY OF THE INVENTION

A rangefinder is described, having visual, transmit and receive channels on a single rangefinder axis. The apparatus includes a first reflector disposed on the axis, and a light emitter disposed on the axis and arranged to emit light toward the reflector. The light emitter is preferably a laser. An objective lens is disposed on the axis for collimating light energy emitted from said light emitter and reflected by the reflector, thereby directing a collimated light beam output from the rangefinder to a target for reflection back to the rangefinder as a return beam. The light emitter, first reflector and objective lens provide a transmit channel for directing the rangefinder output beam toward the target.

The rangefinder further includes a rangefinder reticle disposed on the axis at a focal point of the objective lens, so that a return beam from the target is imaged by the lens onto the reticle. A second, wavelength-sensitive reflector is disposed between the lens and the reticle to redirect most of the return beam energy toward a detector while passing a portion of the return beam to the reticle. In a preferred embodiment, the second reflector is a dichroic reflector tuned to the wavelength of the laser. The objective lens, second reflector and detector form the receive channel also disposed on the rangefinder axis.

The rangefinder further includes a visual channel aligned with the rangefinder axis to visually view the scene and target undergoing rangefinding. Ambient light from the target passes through the objective lens and is imaged onto the reticle plane. Since the second reflector is wavelength sensitive, only the light at the wavelength or wavelengths to which this reflector is tuned will be redirected to the detector, passing the ambient light on to the reticle image plane. An eyepiece is disposed on the axis to receive light imaged onto the reticle.

The emitter is disposed between the objective lens and the first reflector, in the preferred embodiment. The detector is disposed on the axis between the second reflector and the first reflector. A field stop is disposed on the axis between the second reflector and the detector.

A processor is responsive to detector signals from the detector for determining range information regarding the target, and a range display is disposed off the axis at the reticle image plane for displaying the range information.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
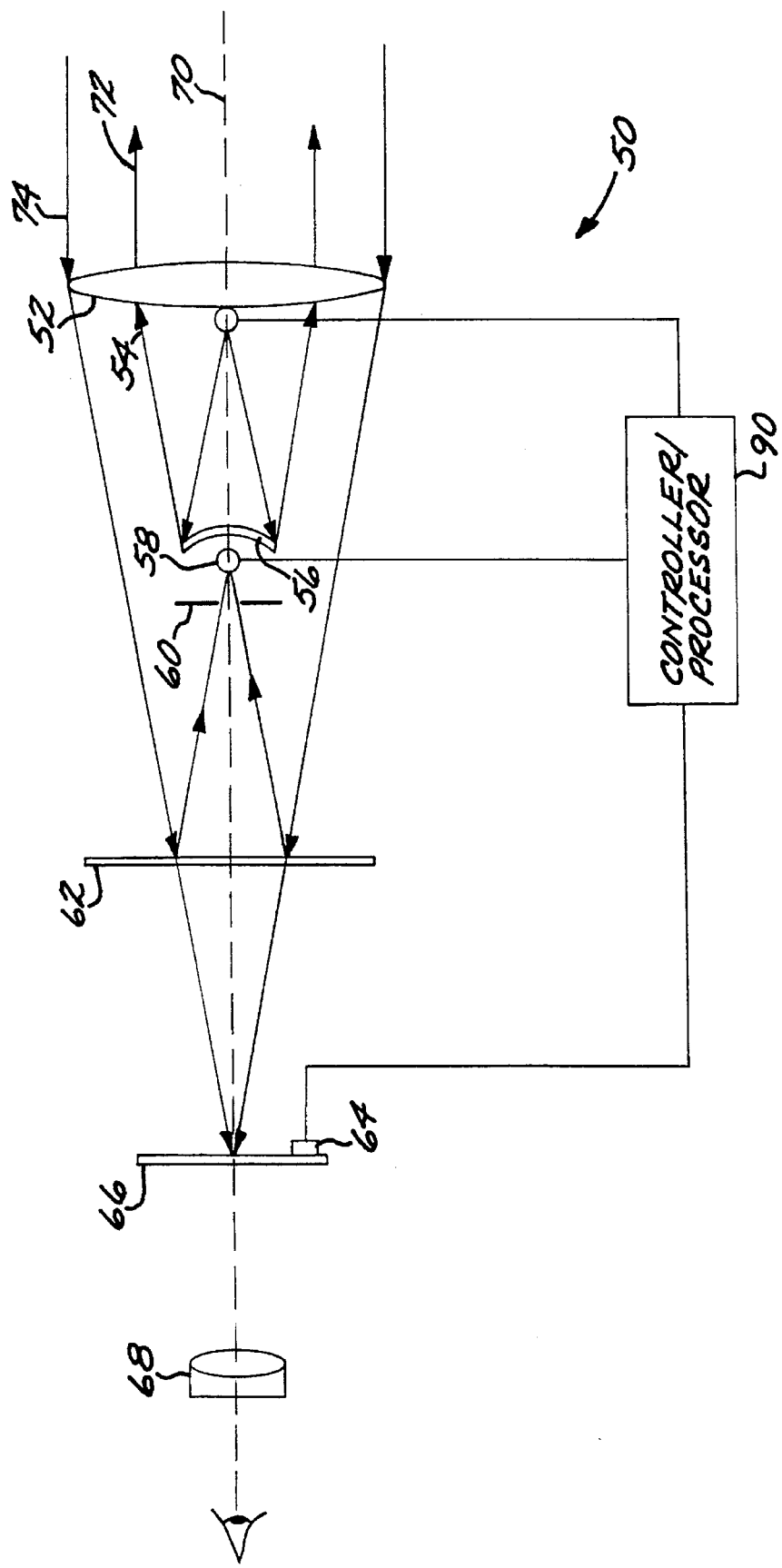
FIG. 1 is a simplified schematic diagram of a laser rangefinder embodying the invention.

A unique arrangement of reflecting and refracting optics is used to give a visual channel, a transmitter channel, and a receiver channel all on the same axis for use as a rangefinder or another similar application.

The optical elements are arranged as shown in FIG. 1 to form an eyesafe, laser rangefinder system 50. The system includes an objective lens 52, an eyesafe laser emitter 54, a reflector 56, a detector 58 and a field stop 60, all mounted on the same axis 70. An eyesafe laser emitter is one of a power sufficiently low enough, or one which emits at a wavelength, such that it will not damage the eye should one be looking directly into the device when it is fired. While the type and wavelength of the laser emitter can vary with application and with technological advances, presently a desired wavelength of choice is 1.54 microns, typically produced by a laser diode, or shifted from 1.06 micron lasers. The system further includes a dichroic reflector 62, a reticle 66 and an eye piece 68, all mounted on the axis 70.

A range display 64 is also provided, off axis 70. The display can be a type of LED or LCD segmented display to display the measured range value in some unit of measure.

The eyesafe emitter 54, reflector 56 and objective lens 52 form an optical system that collimates the energy from the emitter into a beam, and this beam is then reflected from the target. In particular, the emitter 54 is arranged to direct the emitted light energy toward the reflector 56. The reflector 56 reflects and redirects the light emitted by emitter 54 back toward the lens 52, which in turn collimates the beam of light reflected by reflector 56. The detailed shape of the reflector 56 is dependent on the emitter characteristics and beam shape, as well as on the application-specific details of shortening and folding up the optical path. In one exemplary implementation, the reflector 56 has a spherical reflective surface. It is noted that the emitter 54 may block a portion of the on-axis reflected light from the reflector 56, but the blocked light is a small fraction of the total energy of the light beam reflected from the reflector 56. The emitted energy from emitter 54 is blocked from directly passing to the eyepiece 68 by the reflector 56.

The beam 72 collimated by lens 52 is reflected from the target (not shown). Some of the target-reflected energy reaches the objective lens 52 as return beam 74. The objective lens has a focal length equal to the spacing distance of the reticle 66 from the lens 52 along axis 70. Thus, the return beam 74 is imaged onto the reticle 66, but impinges on the dichroic reflector 62 prior to reaching the reticle 66. The dichroic reflector 62, redirects most of the incident return beam 74 as eyesafe energy to the field stop 60 and detector 58. The reflector 62 is wavelength dependent, and reflects, in the ideal case, all of the target return energy from emitter 54 onto the field stop 60, which is simply an aperture in an opaque plate. The size of the field stop defines the region in space, i.e., the angular view, observed by the receiver channel detector. The exact size of the field stop aperture is a system-dependent characteristic, taking into account the system alignment tolerances and transmitter beam divergence, range, detector sensitivity and the like. The detector output is then provided to a controller/processor 90, which also controls the operation of the light emitter 54 and the range display 64.

Suitable processing of the relationships between the emitter and detector signals yields range information, be it time of flight or correlation. Such processing is well known in the art. There are two typical processing techniques. One is to calculate the simple time of flight of the emitted energy beam, e.g., by starting a counter when the laser fires, and stopping the counter when the first return energy is detected. The second technique is by autocorrelation, e.g., by sending a coded pulse train, and then using autocorrelation techniques to pick out the very weak return signals from the noise.

For aiming and viewing, the visible energy on the reticle image is viewed via an eyepiece 68. The eyepiece is used to view the image on the reticle, and is simply a magnifier, or an image erecting component. Thus, the system provides a sighting or visual channel, which views through a donut shaped pupil. The visual channel still views on the common axis, even though the paraxial beam is blocked.

The reticle 66, field stop 60, and emitter 54 are all boresighted to each other.

The system 50 provides several advantages over the conventional side-by-side rangefinder systems. This system does not require a heavy, expensive beamsplitter, and has better thermal stability due to the co-axiality of all the components. The system has improved mechanical stability over the conventional side-by-side device. The dichroic reflector prevents the laser energy from travelling to the user's eye, and can also provide protection from other laser devices. The main function of the dichroic reflector 62 is to redirect the energy reflected from the target and received through the objective lens 52 back toward the detector 58. It does this by wavelength selection. As an additional function, the reflector 62 can be constructed to reflect other eye damaging wavelengths to the detector, and thus not enter the user's eye. Further protection can be provided in the eyepiece 68 using absorbing filters or reflecting coatings to yield the desired attenuation.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A rangefinder characterized by a rangefinder axis, comprising:

light emitting means disposed on the axis and arranged to emit a beam of light at a predetermined wavelength;

an objective lens disposed on the axis for collimating light energy emitted from said light emitter, thereby directing a collimated light beam output from said rangefinder to a target for reflection back to said rangefinder;

a rangefinder reticle disposed on the axis at a focal point of said objective lens, so that a return light beam from said target is imaged by said lens onto said reticle; and a wavelength-sensitive reflector tuned to said wavelength and disposed between said lens and said reticle to redirect a portion of said return light beam toward a detector while passing a portion of said reflected light beam to said reticle.

2. The rangefinder of claim 1 wherein said emitting means comprises a light emitter disposed between said objective lens and a second reflector disposed on said axis, said light emitter arranged to direct an emitted light beam toward said second reflector for reflection back to said objective lens.

3. The rangefinder of claim 1 wherein said wavelength-sensitive reflector is disposed between said reticle and said detector.

4. The rangefinder of claim 3 wherein said detector is disposed on said axis.

5. The rangefinder of claim 4 further comprising a field stop disposed on the axis between said wavelength-sensitive reflector and said detector.

6. The rangefinder of claim 5 wherein said reticle, said field stop, said detector and said emitter are boresighted to each other.

7. The rangefinder of claim 1 further comprising an eyepiece disposed on the axis to receive light imaged onto said reticle.

8. The rangefinder of claim 1 further comprising a processor responsive to detector signals from said detector for determining range information regarding said target, and a range display disposed off the axis at a plane occupied by said reticle for displaying said range information.

9. The rangefinder of claim 1 wherein said light emitter comprises a laser.

10. A rangefinder characterized by a rangefinder axis, comprising:

a first reflector disposed on the axis;

a light emitter disposed on the axis and arranged to emit light toward said reflector;

an objective lens disposed on the axis for collimating light energy emitted from said light emitter and reflected by said reflector, thereby directing a collimated light beam output from said rangefinder to a target for reflection back to said rangefinder;

a rangefinder reticle disposed on the axis at a focal point of said objective lens, so that a return light beam from said target is imaged by said lens onto said reticle; and a second reflector disposed between said lens and said reticle to redirect a portion of said return light beam toward a detector while passing a portion of said reflected light beam to said reticle.

11. The rangefinder of claim 10 wherein said emitter is disposed between said objective lens and said first reflector.

12. The rangefinder of claim 11 wherein said first reflector has a spherical reflective surface on which light emitted by said light emitter impinges, and is then reflected toward said objective lens.

13. The rangefinder of claim 11 wherein said second reflector is disposed between said reticle and said first reflector.

14. The rangefinder of claim 13 wherein said detector is disposed on the axis between said second reflector and said first reflector.

15. The rangefinder of claim 14 further comprising a field stop disposed on the axis between said second reflector and said detector.

16. The rangefinder of claim 15 wherein said reticle, said field stop, said detector and said emitter are boresighted to each other.

17. The rangefinder of claim 10 further comprising an eyepiece disposed on the axis to receive light imaged onto said reticle.

18. The rangefinder of claim 10 further comprising a processor responsive to detector signals from said detector for determining range information regarding said target, and a range display disposed off the axis at a plane occupied by said reticle for displaying said range information.

19. The rangefinder of claim 10 wherein said light emitter comprises a laser.

20. An optical apparatus for directing a collimated beam of light toward a target and processing light reflected by said target back to said optical apparatus, comprising:
 a first reflector disposed on an apparatus axis;
 a light emitter source disposed on said axis and arranged to emit light toward said first reflector;
 an objective lens disposed on said axis for collimating light energy emitted from said light emitter source and reflected by said reflector, thereby directing a collimated light beam output from said optical apparatus to a target for reflection back to said apparatus;
 a reticle disposed on said axis at a focal point of said objective lens, so that a return light beam from said target is imaged by said lens onto said reticle; and
 a second reflector disposed between said lens and said reticle to refract a portion of said return light beam toward a detector while passing a portion of said return light beam to said reticle.

21. The apparatus of claim 20 wherein said emitter is disposed between said objective lens and said first reflector.

22. The apparatus of claim 21 wherein said first reflector has a spherical reflective surface on which light emitted by said light emitter impinges, and is then reflected toward said objective lens.

23. The apparatus of claim 21 wherein said second reflector is disposed between said reticle and said first reflector.

24. The apparatus of claim 23 wherein said detector is disposed on said axis between said second reflector and said first reflector.

25. The apparatus of claim 24 further comprising a field stop disposed on said axis between said second reflector and said detector.

26. The apparatus of claim 25 wherein said reticle, said field stop, said detector and said emitter are boresighted to each other.

27. The apparatus of claim 20 further comprising an eyepiece disposed on said axis to receive light imaged onto said reticle.

28. The apparatus of claim 20 further comprising a processor responsive to detector signals from said detector for determining information regarding said target, and a display disposed off the axis at a plane occupied by said reticle for displaying said information.

29. The apparatus of claim 20 wherein said light emitter comprises a laser.

30. A laser rangefinder characterized by a transmit channel, a receive channel, and a visual channel all on a single axis, comprising:
 a transmit channel comprising a first reflector disposed on the axis, a light emitter source disposed on the axis and arranged to emit light at a predetermined wavelength toward said reflector, and an objective lens disposed on the axis for collimating light energy emitted from said light emitter source and reflected by said reflector, thereby directing a collimated light beam output from said rangefinder to a target for reflection back to said rangefinder;
 a receive channel comprising a rangefinder reticle disposed on the axis at a focal point of said objective lens, so that a return light beam from said target is imaged by said lens onto said reticle, and a second reflector disposed between said lens and said reticle, said second reflector a wavelength-sensitive reflector tuned to said emitter wavelength to redirect a portion of said return light beam toward a detector while passing a portion of said return light beam to said reticle, said reticle and said emitter boresighted to each other; and
 a visual channel comprising an eyepiece disposed on the axis to receive visible light imaged onto said reticle.

31. The rangefinder of claim 30 wherein said emitter is disposed between said objective lens and said first reflector.

32. The rangefinder of claim 31 wherein said first reflector has a spherical reflective surface on which light emitted by said light emitter impinges, and is then reflected toward said objective lens.

33. The rangefinder of claim 31 wherein said second reflector is disposed between said reticle and said first reflector.

34. The rangefinder of claim 33 wherein said detector is disposed on the axis between said second reflector and said first reflector.

35. The rangefinder of claim 34 further comprising a field stop disposed on the axis between said second reflector and said detector.

36. The rangefinder of claim 30 further comprising a processor responsive to detector signals from said detector for determining range information regarding said target, and a range display disposed off the axis at a plane occupied by said reticle for displaying said range information.

37. The rangefinder of claim 30 wherein said light emitter comprises a laser.

* * * * *